(12) United States Patent
Wang

(10) Patent No.: US 10,044,479 B2
(45) Date of Patent: Aug. 7, 2018

(54) METHOD AND APPARATUS FOR TRANSMITTING SIGNAL BETWEEN USER EQUIPMENTS

(71) Applicant: HUAWEI DEVICE CO., LTD., Shenzhen (CN)

(72) Inventor: Jian Wang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 183 days.

(21) Appl. No.: 14/881,699

(22) Filed: Oct. 13, 2015

(65) Prior Publication Data
US 2016/0036576 A1 Feb. 4, 2016

Related U.S. Application Data

(63) Continuation of application No. PCT/CN2013/080230, filed on Jul. 26, 2013.

(51) Int. Cl.
*H04L 5/00* (2006.01)
*H04W 72/04* (2009.01)
*H04L 27/26* (2006.01)
*H04W 88/04* (2009.01)

(52) U.S. Cl.
CPC ........ *H04L 5/0048* (2013.01); *H04L 27/2602* (2013.01); *H04L 27/2613* (2013.01); *H04W 72/0446* (2013.01); *H04L 27/2607* (2013.01); *H04W 88/04* (2013.01)

(58) Field of Classification Search
None
See application file for complete search history.

(56) References Cited

U.S. PATENT DOCUMENTS

| 9,485,069 B2 | 11/2016 | Wang et al. |
| 2011/0268101 A1* | 11/2011 | Wang .............. H04L 5/0053 370/344 |
| 2012/0033589 A1 | 2/2012 | Zheng |

(Continued)

FOREIGN PATENT DOCUMENTS

| CN | 101547496 | 9/2009 |
| CN | 102377722 | 3/2012 |

(Continued)

OTHER PUBLICATIONS

Extended European Search Report dated Jun. 6, 2016 in corresponding European Patent Application No. 13890161.6.

(Continued)

*Primary Examiner* — Edan Orgad
*Assistant Examiner* — Saumit Shah
(74) *Attorney, Agent, or Firm* — Staas & Halsey LLP

(57) ABSTRACT

The present invention discloses a method and an apparatus for transmitting a signal between user equipments. A quantity of OFDM symbols included in a first subframe sent by a first user equipment to a second user equipment is less than a quantity of OFDM symbols included in a second subframe sent by the first user equipment to a network device, where the second subframe includes 14 OFDM symbols, the first subframe includes 13, 12, or 7 OFDM symbols, and the OFDM symbol includes valid data and a cyclic prefix. In this way, interference between OFDM symbols may be avoided, and performance of a D2D ProSe is improved.

14 Claims, 18 Drawing Sheets

(56) References Cited

U.S. PATENT DOCUMENTS

| | | | |
|---|---|---|---|
| 2012/0327895 A1* | 12/2012 | Wallen | H04W 48/12 370/330 |
| 2014/0003262 A1* | 1/2014 | He | H04W 28/08 370/252 |
| 2014/0036718 A1* | 2/2014 | Gao | H04W 72/121 370/254 |
| 2014/0064203 A1 | 3/2014 | Seo et al. | |
| 2014/0079052 A1 | 3/2014 | Senoo | |
| 2014/0086368 A1 | 3/2014 | Yokote | |
| 2014/0369292 A1 | 12/2014 | Wu et al. | |

FOREIGN PATENT DOCUMENTS

| | | |
|---|---|---|
| CN | 103209487 | 7/2013 |
| EP | 2 925 067 A1 | 9/2015 |
| JP | 2007-159124 | 6/2007 |
| JP | 2009-303214 | 12/2009 |
| JP | 2012-85084 | 4/2012 |
| JP | 2013-502139 | 1/2013 |
| JP | 2013-529416 | 7/2013 |
| KR | 10-2013-0028106 | 3/2013 |
| WO | 2011/022567 A1 | 2/2011 |
| WO | 2011/130630 A1 | 10/2011 |
| WO | 2012/071689 A1 | 6/2012 |
| WO | 2012/128505 A2 | 9/2012 |
| WO | 2012/153659 A1 | 11/2012 |
| WO | WO2012172628 | 12/2012 |
| WO | 2013/000818 A1 | 1/2013 |

OTHER PUBLICATIONS

Pietsch et al., "EPoC Downstream Pilot Proposal", server date Jul. 16, 2013; downloaded by EPO on Jul. 18, 2013.

Japanese Office Action dated Aug. 30, 2016 in corresponding Japanese Patent Application No. 2015-559408.

Korean Office Action dated Dec. 18, 2016 in corresponding Korean Patent Application No. 10-2015-7023091.

International Search Report dated May 12, 2014 in corresponding international application PCT/CN2013/080230.

Search Report, dated Apr. 26, 2016, in corresponding Chinese Application No. 201380000658.6 (9 pp.).

*Timing of D2D transmissions and impact on the LTE system*, 3GPP TSG RAN WG1 Meeting #73, R1-132071, Fukuoka, Japan, May 20-24, 2013 (4 pp.).

*Device discovery in network coverage*, 3GPP TSG RAN WG1 Meeting #73, R1-132248, Fukuoka, Japan, May 20-24, 2013 (pp. 1-4).

*Physical layer enhancements for D2D communication*, 3GPP TSG RAN WG1 Meeting #73, R1-132250, Fukuoka, Japan, May 20-24, 2013 (pp. 1-10).

PCT International Search Report dated May 12, 2014 in corresponding International Patent Application No. PCT/CN2013/080230.

Notice of Reasons for Rejection, dated May 9, 2017, in Japanese Application No. 2015-559408 (9 pp.).

* cited by examiner

METHOD AND APPARATUS FOR TRANSMITTING SIGNAL BETWEEN USER EQUIPMENTS

CROSS-REFERENCE TO RELATED APPLICATIONS

This application is a continuation of International Application No. PCT/CN2013/080230, filed on Jul. 26, 2013, which is hereby incorporated by reference in its entirety.

TECHNICAL FIELD

Embodiments of the present invention relate to the field of communications technologies, and in particular, to a method and an apparatus for transmitting a signal between user equipments.

BACKGROUND

When a physical layer of a Long Term Evolution (Long Term Evolution, LTE) system is used to perform a service of direct communication between user equipments (for example, a first user equipment and a second user equipment) (Device to Device Proximity Service, D2D ProSe), the first user equipment needs to send a discovery signal to the nearby second user equipment, so that the second user equipment can recognize the nearby first user equipment according to the discovery signal and receive the discovery signal; then a process of direct communication between the first user equipment and the second user equipment is implemented, which includes, for example, a series of processes including call initiation, channel measurement, channel feedback, resource scheduling, data transmission, call completion, and the like.

In an existing D2D ProSe, for example, a data frame of an LTE time division duplex (Time Division Duplexing, TDD) system or a data frame of an LTE frequency division duplex (Frequency Division Duplexing, FDD) system may be used to transmit a D2D signal between a first user equipment and a second user equipment, where the D2D signal includes a discovery signal and a direct communication signal.

However, because the first user equipment sends a D2D signal to the second user equipment by using downlink timing of an LTE system, and the second user equipment receives a D2D signal by using uplink timing of the LTE system, when the downlink timing is different from the uplink timing, a time difference exists between a time at which the D2D signal sent by the first user equipment reaches the second user equipment and the uplink timing of the second user equipment, and the existing time difference causes interference between OFDM symbols in a data frame. As a result, the second user equipment cannot parse out the D2D signal, and performance of the D2D ProSe is affected.

SUMMARY

The present invention provides a method and an apparatus for transmitting a signal between user equipments, which are used to solve a problem of interference between OFDM symbols in a process of direct communication between the user equipments, thereby improving performance of a D2D ProSe.

According to a first aspect, a method for transmitting a signal between user equipments is provided, including:

sending, by a first user equipment, a first subframe to a second user equipment, where a quantity of orthogonal frequency division multiplexing OFDM symbols included in the first subframe is less than a quantity of OFDM symbols included in a second subframe, and the second subframe is a subframe received by a network device; and the second subframe includes 14 OFDM symbols, the first subframe includes 13, 12, or 7 OFDM symbols, and the OFDM symbol includes valid data and a cyclic prefix.

Based on the first aspect, in a first possible implementation manner, a time length of the first subframe is 1 millisecond or 30,720 timeslots; and if the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

Based on the first aspect or the first possible implementation manner of the first aspect, in a second possible implementation manner, if the first subframe includes 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots, and time lengths of cyclic prefixes of the second to thirteenth OFDM symbols are all 315 timeslots;

if the first subframe includes 12 OFDM symbols, a time length of each OFDM symbol of the 12 OFDM symbols is 512 timeslots plus 2,048 timeslots, where a time length of a cyclic prefix of each OFDM symbol is 512 timeslots; or if the first subframe includes 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

Based on the first aspect or the first or second possible implementation manner of the first aspect, in a third possible implementation manner, before the sending, by a first user equipment, a first subframe to a second user equipment, the method includes:

inserting, by the first user equipment, a reference signal into the first subframe according to a reference signal insert mode corresponding to the first subframe.

Based on the third possible implementation manner of the first aspect, in a fourth possible implementation manner, if the first subframe includes 13 OFDM symbols, the reference signal insert mode corresponding to the subframe includes at least one of a first reference signal insert mode to a forty-first reference signal insert mode; or if the first subframe includes 12 OFDM symbols, the reference signal insert mode corresponding to the first subframe includes at least one of a forty-second reference signal insert mode to a forty-third reference signal insert mode; or if the first subframe includes 7 OFDM symbols, the reference signal insert mode corresponding to the first subframe includes at least one of a forty-fourth reference signal insert mode to a forty-fifth reference signal insert mode.

Based on the third or fourth possible implementation manner of the first aspect, in a fifth possible implementation manner, the sending, by a first user equipment, a first subframe to a second user equipment includes:

sending, by the first user equipment, the first subframe into which the reference signal is inserted to the second user equipment, so that the second user equipment parses the first subframe according to the reference signal inserted into the first subframe.

According to a second aspect, an apparatus for transmitting a signal between user equipments is provided, including:

a sending module, configured to send a first subframe to another user equipment, where a quantity of orthogonal frequency division multiplexing OFDM symbols included in the first subframe is less than a quantity of OFDM symbols included in a second subframe, and the second subframe is a subframe received by a network device; and the second subframe includes 14 OFDM symbols, the first subframe includes 13, 12, or 7 OFDM symbols, and the OFDM symbol includes valid data and a cyclic prefix.

Based on the second aspect, in a first possible implementation manner, a time length of the first subframe is 1 millisecond or 30,720 timeslots; and if the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

Based on the second aspect or the first possible implementation manner of the second aspect, in a second possible implementation manner, if the first subframe includes 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots, and time lengths of cyclic prefixes of the second to thirteenth OFDM symbols are all 315 timeslots;

if the first subframe includes 12 OFDM symbols, a time length of each OFDM symbol of the 12 OFDM symbols is 512 timeslots plus 2,048 timeslots, where a time length of a cyclic prefix of each OFDM symbol is 512 timeslots; or if the first subframe includes 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

Based on the second aspect or the first or second possible implementation manner of the second aspect, in a third possible implementation manner, the apparatus further includes:

a configuration module, configured to insert a reference signal into the first subframe according to a reference signal insert mode corresponding to the first subframe.

Based on the third possible implementation manner of the second aspect, in a fourth possible implementation manner, if the first subframe includes 13 OFDM symbols, the reference signal insert mode corresponding to the subframe includes at least one of a first reference signal insert mode to a forty-first reference signal insert mode; or if the first subframe includes 12 OFDM symbols, the reference signal insert mode corresponding to the first subframe includes at least one of a forty-second reference signal insert mode to a forty-third reference signal insert mode; or if the first subframe includes 7 OFDM symbols, the reference signal insert mode corresponding to the first subframe includes at least one of a forty-fourth reference signal insert mode to a forty-fifth reference signal insert mode.

Based on the third or fourth possible implementation manner of the second aspect, in a fifth possible implementation manner, the sending module is specifically configured to send the first subframe into which the reference signal is inserted by the configuration module to the another user equipment, so that the another user equipment parses the first subframe according to the reference signal inserted into the first subframe.

According to a third aspect, a user equipment is provided, including a processor and a radio frequency component, where the processor is configured to: when the user equipment directly communicates with another user equipment, transmit D2D information by using a first subframe and send the first subframe to the radio frequency component, where the D2D information is information transmitted when the user equipment directly communicates with the another user equipment; and the radio frequency component is configured to send the first subframe to the another user equipment by using an antenna, where a quantity of orthogonal frequency division multiplexing OFDM symbols included in the first subframe is less than a quantity of OFDM symbols included in a second subframe, and the second subframe is a subframe received by a network device; and the second subframe includes 14 OFDM symbols, the first subframe includes 13, 12, or 7 OFDM symbols, and the OFDM symbol includes valid data and a cyclic prefix.

Based on the third aspect, in a first possible implementation manner, a time length of the first subframe is 1 millisecond or 30,720 timeslots; and if the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

Based on the third aspect or the first possible implementation manner of the third aspect, in a second possible implementation manner, if the first subframe includes 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots, and time lengths of cyclic prefixes of the second to thirteenth OFDM symbols are all 315 timeslots;

if the first subframe includes 12 OFDM symbols, a time length of each OFDM symbol of the 12 OFDM symbols is 512 timeslots plus 2,048 timeslots, where a time length of a cyclic prefix of each OFDM symbol is 512 timeslots; or if the first subframe includes 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

Based on the third aspect or the first or second possible implementation manner of the third aspect, in a third possible implementation manner, the processor is further configured to insert a reference signal into the first subframe according to a reference signal insert mode corresponding to the first subframe.

Based on the third possible implementation manner of the third aspect, in a fourth possible implementation manner, if the first subframe includes 13 OFDM symbols, the reference signal insert mode corresponding to the subframe includes at least one of a first reference signal insert mode to a forty-first reference signal insert mode; or if the first subframe includes 12 OFDM symbols, the reference signal insert mode corresponding to the first subframe includes at least one of a forty-second reference signal insert mode to a forty-third reference signal insert mode; or if the first subframe includes 7 OFDM symbols, the reference signal insert mode corresponding to the first subframe includes at least one of a forty-fourth reference signal insert mode to a forty-fifth reference signal insert mode.

Based on the third or fourth possible implementation manner of the third aspect, in a fifth possible implementation manner, the radio frequency component is specifically configured to send the first subframe into which the reference signal is inserted by the processor to the another user equipment by using the antenna, so that the another user equipment parses, according to the reference signal inserted into the first subframe, the D2D information transmitted in the first subframe.

Based on the third aspect or any one of the first to fifth possible implementation manners of the third aspect, in a sixth possible implementation manner, the radio frequency component is further configured to receive, by using the antenna, the first subframe that is sent by the another user equipment and into which the reference signal is inserted; and the processor is further configured to parse, according to the reference signal inserted into the first subframe, D2D information transmitted in the first subframe.

Based on the third aspect, in a seventh possible implementation manner, the processor is further configured to: when the user equipment communicates with the network device, transmit information by using the second subframe, and send the second subframe to the radio frequency component; and the radio frequency component is further configured to send the second subframe to the network device by using the antenna.

According to the present invention, a quantity of OFDM symbols included in a first subframe sent by a first user equipment to a second user equipment is reduced, so that the quantity of OFDM symbols included in the first subframe is less than a quantity (14) of OFDM symbols included in a second subframe sent by the first user equipment to a network device. In this way, a time length of a cyclic prefix of each OFDM symbol in the first subframe can be increased, and therefore, a time difference between a time at which the first subframe sent by the first user equipment reaches the second user equipment and uplink timing of the second user equipment is less than the time length of the cyclic prefix of each OFDM symbol in the first subframe, thereby avoiding interference between symbols and improving performance of a D2D ProSe.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 1 is a schematic diagram of a format of a first subframe applied in an embodiment of the present invention;

DESCRIPTION OF EMBODIMENTS

Figure 1:
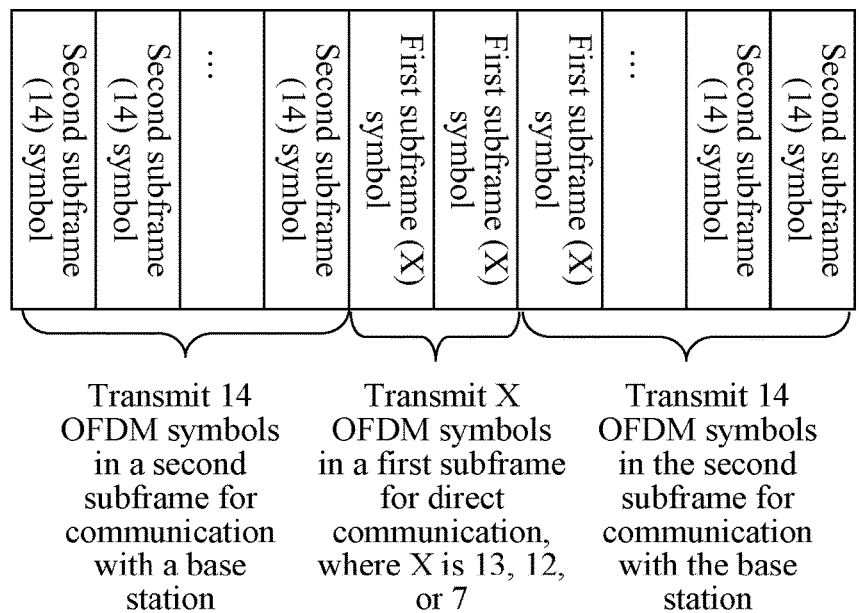
FIG. 1-A is a schematic diagram of comparison between quantities of OFDM symbols included in a first subframe and a second subframe that are applied in an embodiment of the present invention.
Figure 1:
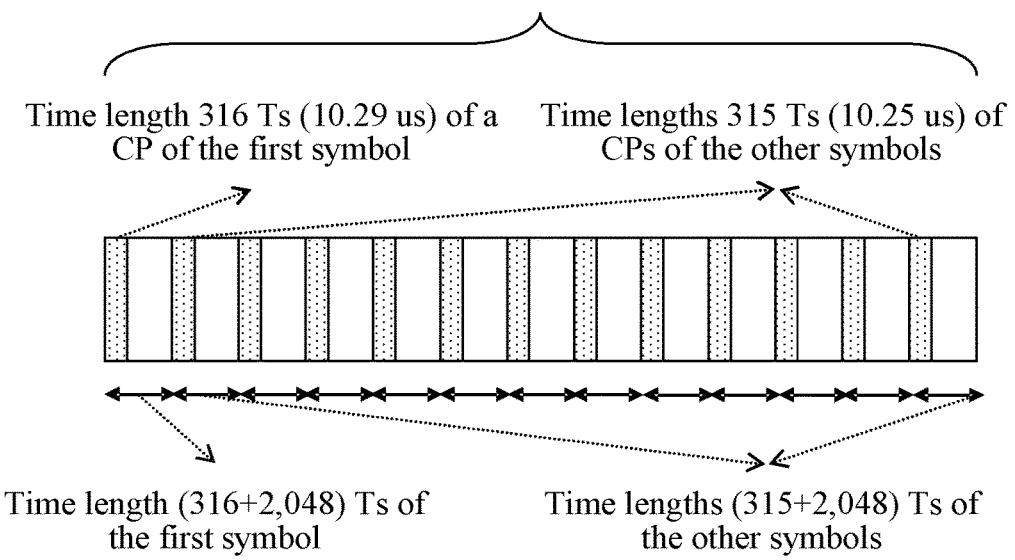

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The technical solutions of the present invention may be applied to various wireless communications systems, for example, a Global System for Mobile Communications (Global System for Mobile Communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (World Interoperability for Microwave Access, WiMAX for short) system.

In an existing D2D ProSe, when a first user equipment directly communicates with a second user equipment, the first user equipment may send a D2D signal to the second user equipment by using a data frame of an LTE TDD system or a data frame of an LTE FDD system, where the data frame of the TDD system or of the FDD system is a data frame used for communication between a user equipment and a network device (for example, a base station).

According to a frame format of a data frame of the existing LTE TDD system or FDD system, 1 data frame includes 10 subframes, and each subframe includes 14 orthogonal frequency division multiplexing (Orthogonal Frequency Division Multiplexing, OFDM) symbols. Of the 14 symbols, time lengths (time length for short) of cyclic prefixes (cyclic prefix, CP) of two symbols are 160 Ts (5.21 us), and time lengths of cyclic prefixes of 12 symbols are 144 Ts (4.69 us), where Ts represents timeslot, and us represents microsecond.

However, during actual application, a D2D ProSe needs to at least support an application scenario in which a distance between two user equipments is 577 m (that is, D2D range=577 m) and an inter-site distance (Inter site distance, ISD) is 500 (that is, ISD=500).

When a multipath delay is not considered, when a D2D range between the first user equipment and the second user equipment is equal to 577 m and ISD=500, a time difference between a time at which a subframe sent by the first user equipment reaches the second user equipment and uplink timing of the second user equipment is 4.15 us. However, during actual application, if a multipath delay is considered, a time length value 144 Ts (4.69 us) of a cyclic prefix in an existing LTE system is exceeded, thereby causing interference between OFDM symbols in the subframe.

In order to avoid interference between OFDM symbols, in an optional implementation manner of the present invention, when a first user equipment directly communicates with a second user equipment, a quantity of OFDM symbols included in a first subframe sent by the first user equipment to the second user equipment is less than a quantity of OFDM symbols included in a second subframe received by a network device, where the second subframe is a subframe received by the network device.

FIG. 1-A is a schematic diagram of comparison between quantities of OFDM symbols included in a first subframe and a second subframe that are applied in an embodiment of the present invention. As shown in FIG. 1-A, the second subframe may be, for example, a subframe included in a data frame, used for communication between a first user equipment and a network device (for example, a base station), of a TDD system or an FDD system, the second subframe includes 14 OFDM symbols, and the first subframe applied in this embodiment for direct communication includes, for example, 13, 12, or 7 OFDM symbols.

A time length of the first subframe is 1 millisecond or 30,720 timeslots, and the OFDM symbol includes valid data and a cyclic prefix.

When the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots. FIG. 1 is a schematic diagram of a format of a first subframe applied in an embodiment of the present invention. As shown in FIG. 1, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots (10.29 us), which is greater than a time length 144 Ts (4.69 us) of a cyclic prefix of an OFDM symbol in the prior art, and time lengths of cyclic prefixes of the second to thirteenth OFDM symbols are all 315 timeslots (10.25 us), which is greater than a time length 144 Ts (4.69 us) of a cyclic prefix of an OFDM symbol in the prior art.

Figure 2:
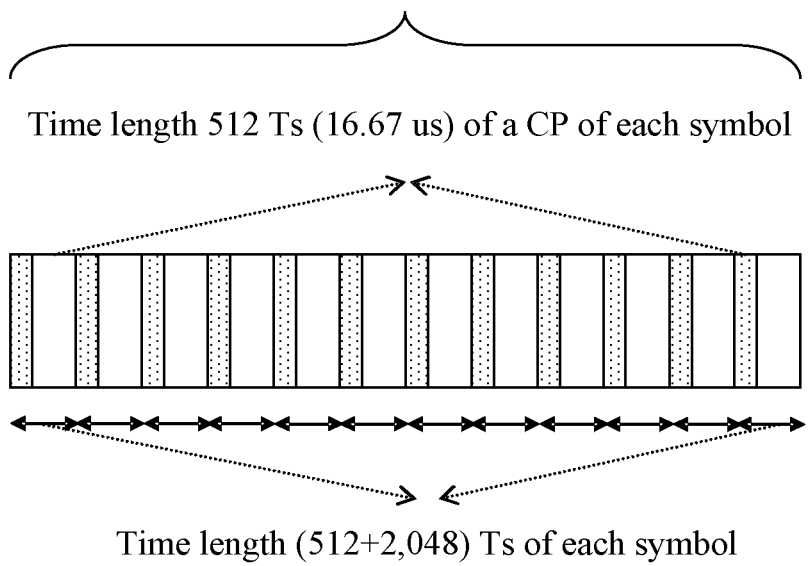
FIG. 2 is a schematic diagram of another format of a first subframe applied in an embodiment of the present invention.

When the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots. FIG. 2 is a schematic diagram of another format of a first subframe applied in an embodiment of the present invention. As shown in FIG. 2, a time length of each OFDM symbol of the 12 OFDM symbols is 512 timeslots plus 2,048 timeslots, where a time length of a cyclic prefix of each OFDM symbol is 512 timeslots (16.67 us), which is greater than a time length 144 Ts (4.69 us) of a cyclic prefix of an OFDM symbol in the prior art.

Figure 3:
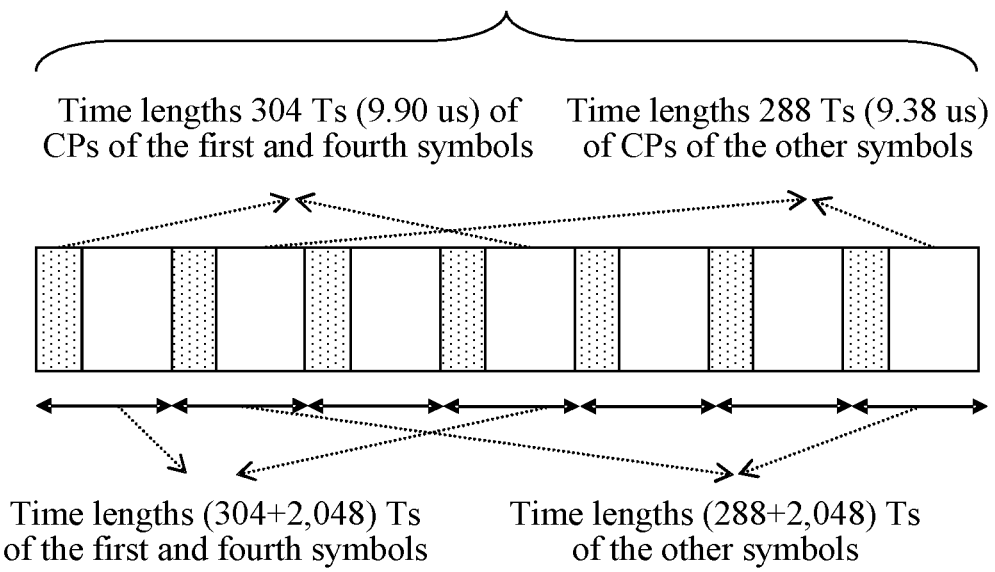
FIG. 3 is a schematic diagram of another format of a first subframe applied in an embodiment of the present invention.

When the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots. FIG. 3 is a schematic diagram of another format of a first subframe applied in an embodiment of the present invention. As shown in FIG. 3, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots (9.38 us), which is greater than a time length 144 Ts (4.69 us) of a cyclic prefix of an OFDM symbol in the prior art.

In this embodiment of the present invention, a quantity of OFDM symbols included in a first subframe sent by a first user equipment to a second user equipment is reduced, so that the quantity of OFDM symbols included in the first subframe is less than a quantity (14) of OFDM symbols included in a second subframe sent by the first user equipment to a network device. In this way, a time length of a cyclic prefix of each OFDM symbol in the first subframe can be increased, and therefore, a time difference between a time at which the first subframe sent by the first user equipment reaches the second user equipment and uplink timing of the second user equipment is less than the time length of the cyclic prefix of each OFDM symbol in the first subframe, thereby avoiding interference between symbols and improving performance of a D2D ProSe.

Figure 4:
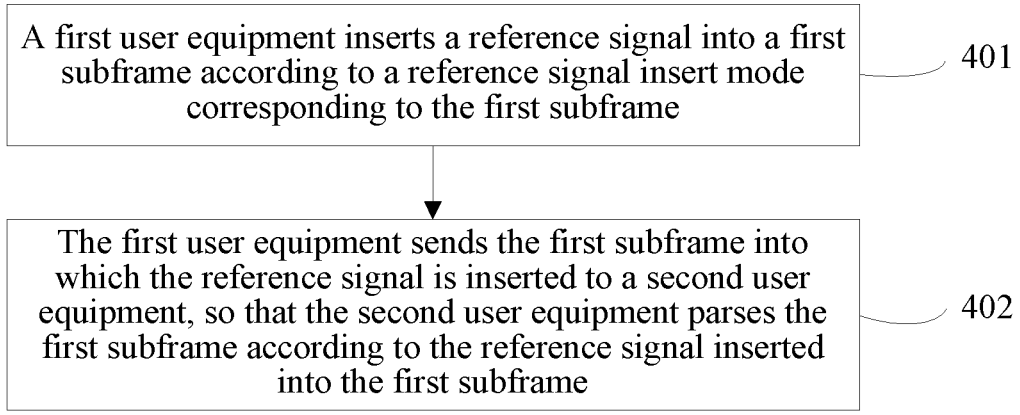
FIG. 4 is a schematic flowchart of a method for transmitting a signal between user equipments according to an embodiment of the present invention.

FIG. 4 is a schematic flowchart of a method for transmitting a signal between user equipments according to an embodiment of the present invention. Based on the first subframe in any one of FIG. 1 to FIG. 3, as shown in FIG. 4, the method for transmitting a signal between user equipments in this embodiment may include:

401: A first user equipment inserts a reference signal into the first subframe according to a reference signal insert mode corresponding to the first subframe.

During specific implementation, when sending the first subframe to a second user equipment, the first user equipment needs to insert the reference signal into the first subframe, so that the second user equipment may perform, when receiving the first subframe, channel estimation by using the reference signal inserted into the first subframe, and only after a channel is estimated, the first subframe can be demodulated and decoded to restore an original D2D signal.

When excessive reference signals are inserted into the first subframe, the reference signals occupy excessive system space, thereby reducing valid data transmitted in the subframe and reducing a system capacity. When insufficient reference signals are inserted into the first subframe, the second user equipment cannot correctly perform demodulation and decoding to restore the original D2D signal.

This embodiment of the present invention provides the reference signal insert mode corresponding to the first subframe in any one of FIG. 1 to FIG. 3. It is proved through practical application that, by using the reference signal insert mode provided in this embodiment of the present invention, reference symbol overheads are reduced as much as possible, and demodulation and decoding may be performed efficiently to restore the original D2D signal.

Figure 5:
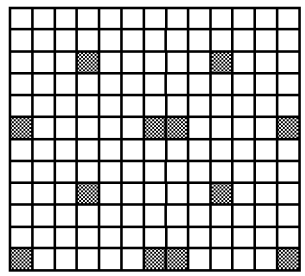
FIG. 5 to FIG. 45 are schematic diagrams of a first reference signal insert mode to a forty-first reference signal insert mode corresponding to the first subframe shown in FIG. 1.
Figure 6:
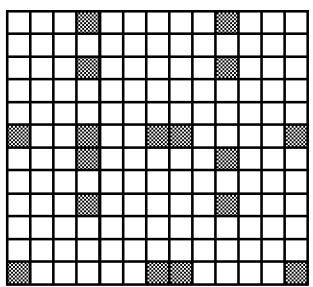
Figure 7:
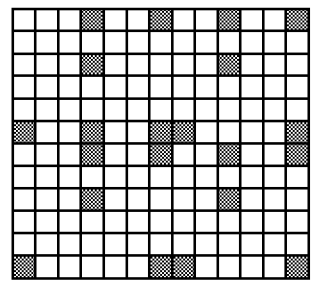
Figure 8:
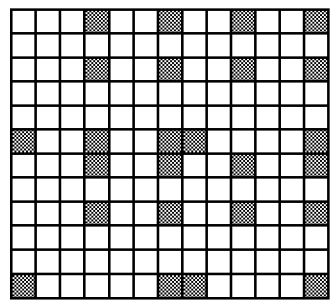
Figure 9:
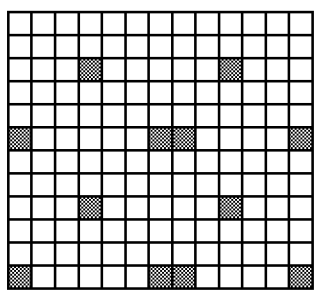
Figure 10:
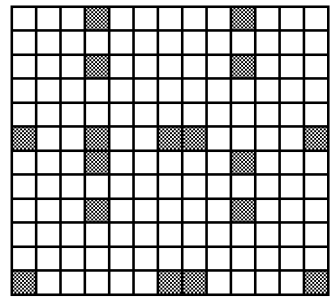
Figure 11:
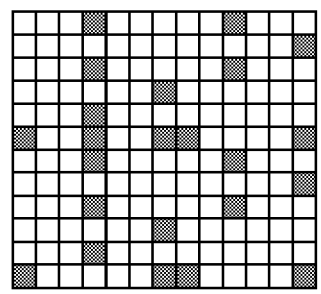
Figure 12:
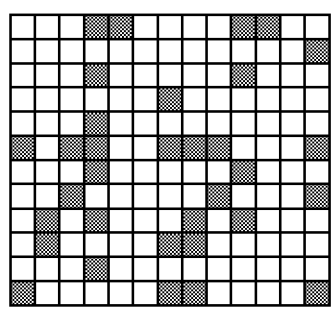
Figure 13:
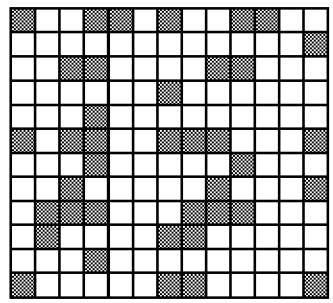
Figure 14:
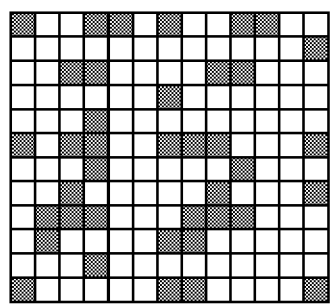
Figure 15:
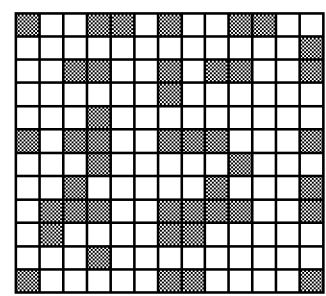
Figure 16:
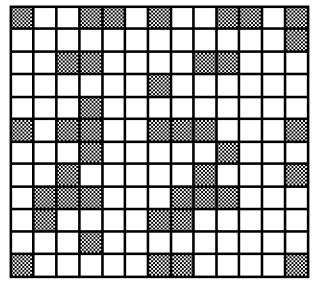
Figure 17:
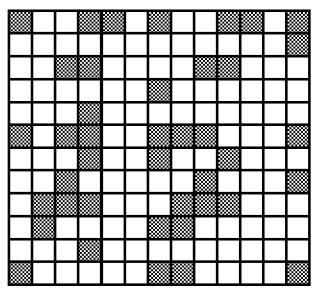
Figure 18:
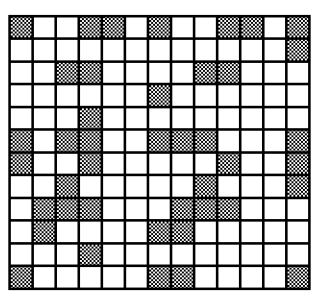
Figure 19:
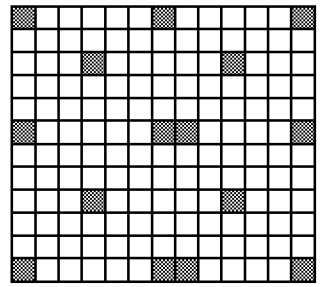
Figure 20:
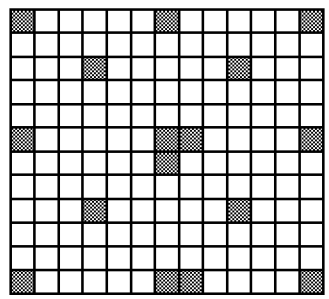
Figure 21:
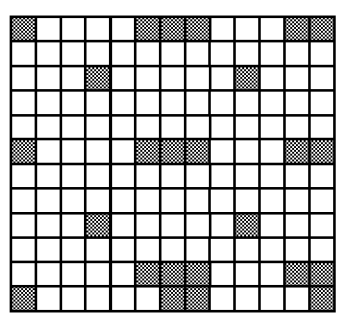
Figure 22:
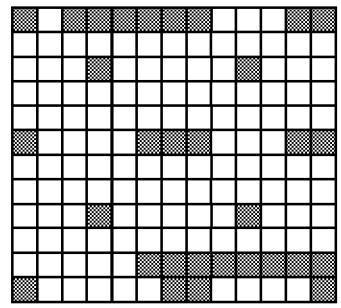
Figure 23:
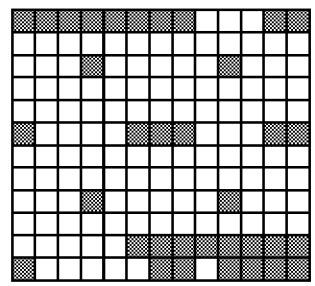
Figure 24:
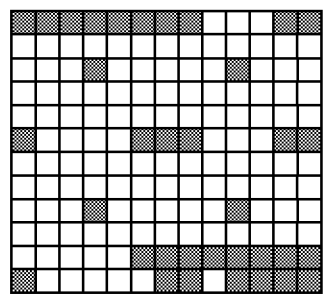
Figure 25:
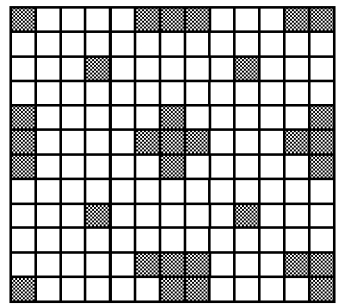
Figure 26:
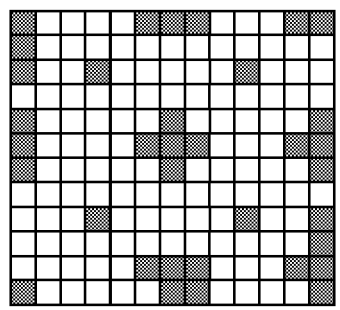
Figure 27:
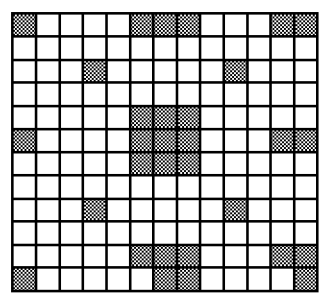
Figure 28:
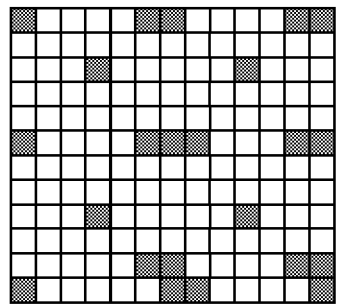
Figure 29:
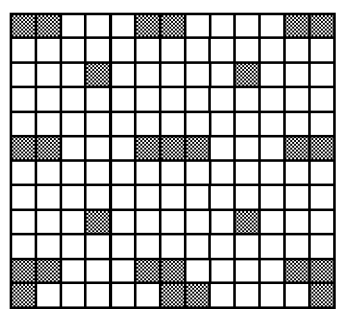
Figure 30:
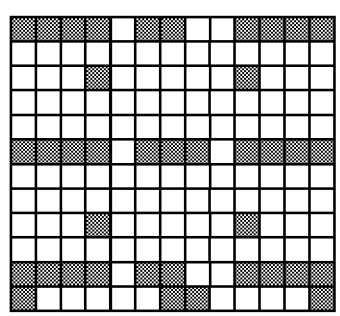
Figure 31:
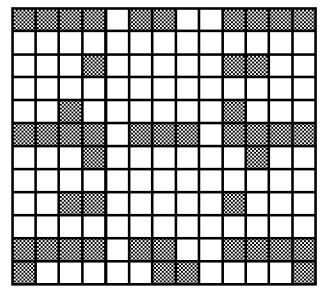
Figure 32:
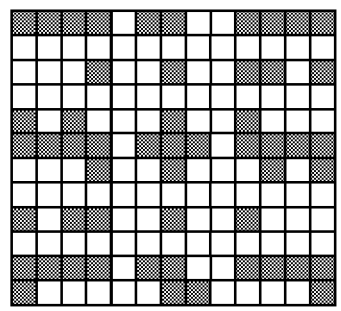
Figure 33:
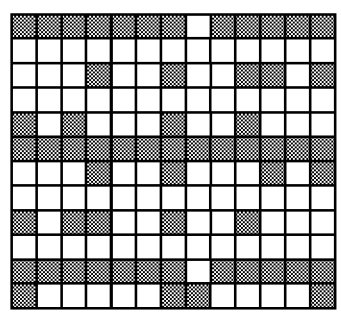
Figure 34:
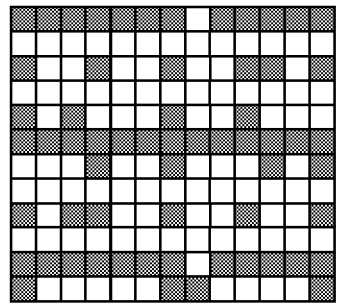
Figure 35:
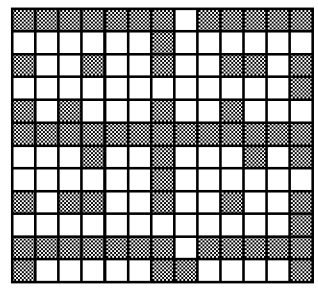
Figure 36:
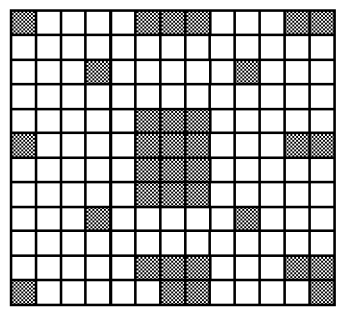
Figure 37:
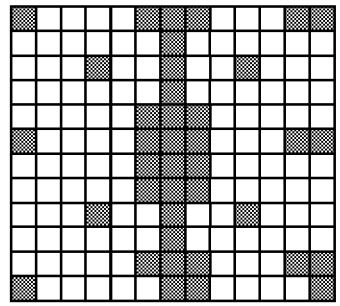
Figure 38:
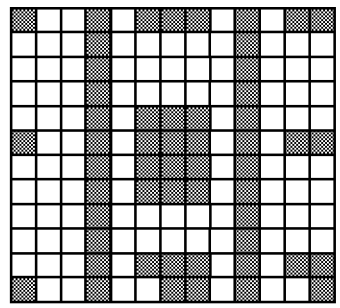
Figure 39:
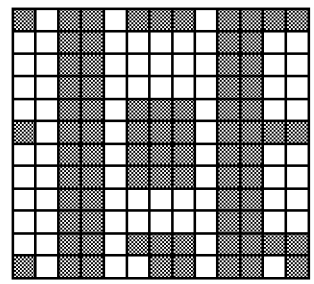
Figure 40:
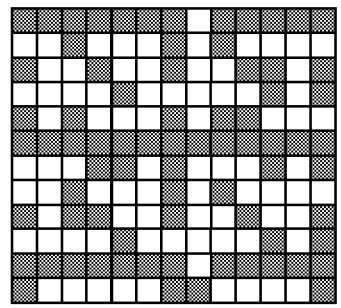
Figure 41:
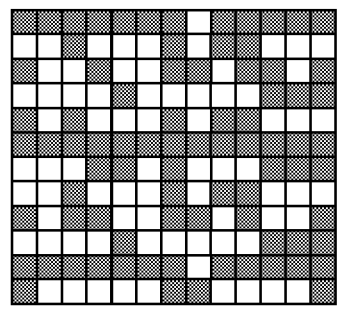
Figure 42:
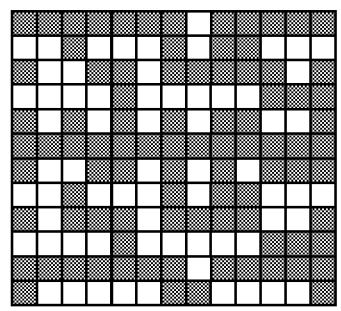
Figure 43:
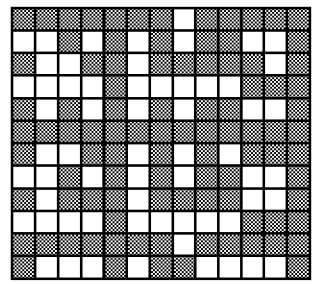
Figure 44:
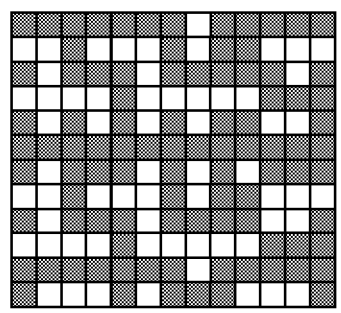
Figure 45:
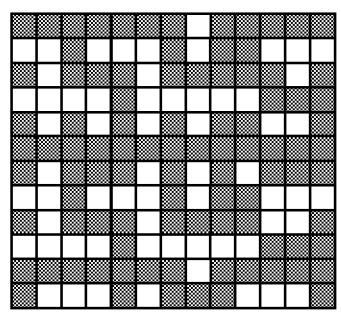

In an optional implementation manner of the present invention, when the first subframe includes 13 OFDM symbols, FIG. 5 to FIG. 45 are schematic diagrams of a first reference signal insert mode to a forty-first reference signal insert mode corresponding to the first subframe shown in FIG. 1. As shown in FIG. 5 to FIG. 45, the first subframe used in this embodiment includes 13 OFDM symbols and 12 subcarriers, where the 13 OFDM symbols are represented in a horizontal direction, and the 12 subcarriers are represented in a vertical direction. The first reference signal insert mode shown in FIG. 5 is used as an example to describe insertion of a reference signal. Reference signals are inserted into the fourth OFDM symbol and the tenth OFDM symbol of the third subcarrier; reference signals are inserted into the first OFDM symbol and the seventh OFDM symbol of the sixth subcarrier; reference signals are inserted into the fourth OFDM symbol and the tenth OFDM symbol of the ninth subcarrier; and reference signals are inserted into the first OFDM symbol and the seventh OFDM symbol of the twelfth subcarrier, where shaded parts in the figure represent the inserted reference signals.

Descriptions about the second reference signal insert mode to the forty-first reference signal insert mode are not provided again.

Figure 46:
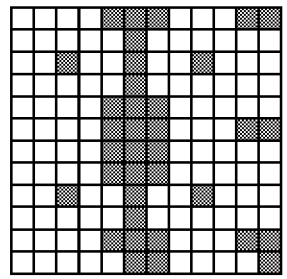
FIG. 46 to FIG. 47 are schematic diagrams of a forty-second reference signal insert mode to a forty-third reference signal insert mode corresponding to the first subframe shown in FIG. 2.
Figure 47:
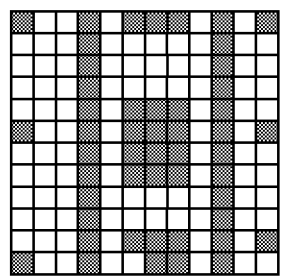

In an optional implementation manner of the present invention, when the first subframe includes 12 OFDM symbols, FIG. 46 to FIG. 47 are schematic diagrams of a forty-second reference signal insert mode and a forty-third reference signal insert mode corresponding to the first subframe shown in FIG. 2, and insertion of a reference signal is not described in detail again.

Figure 48:
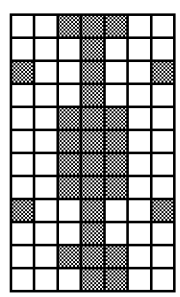
FIG. 48 to FIG. 49 are schematic diagrams of a forty-fourth reference signal insert mode to a forty-fifth reference signal insert mode corresponding to the first subframe shown in FIG. 3.
Figure 49:
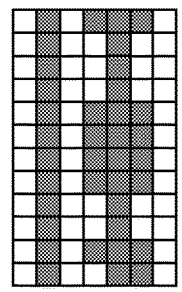

In an optional implementation manner of the present invention, when the first subframe includes 7 OFDM symbols, FIG. 48 to FIG. 49 are schematic diagrams of a forty-fourth reference signal insert mode and a forty-fifth reference signal insert mode corresponding to the first subframe shown in FIG. 3, and insertion of a reference signal is not described in detail again.

402: The first user equipment sends the first subframe into which the reference signal is inserted to a second user equipment, so that the second user equipment parses the first subframe according to the reference signal inserted into the first subframe.

When parsing the first subframe according to the reference signal inserted into the first subframe, the second user equipment may, for example, perform channel estimation by using the reference signal inserted into the first subframe, and only after a channel is estimated, the first subframe can be demodulated and decoded to restore an original D2D signal. For a specific process, reference may be made to related content in the prior art, which is not described in detail again.

In this embodiment of the present invention, a quantity of OFDM symbols included in a first subframe sent by a first user equipment to a second user equipment is reduced, so that the quantity of OFDM symbols included in the first subframe is less than a quantity (14) of OFDM symbols included in a second subframe sent by the first user equipment to a network device. In this way, a time length of a cyclic prefix of each OFDM symbol in the first subframe can be increased, and therefore, a time difference between a time at which the first subframe sent by the first user equipment reaches the second user equipment and uplink timing of the second user equipment is less than the time length of the cyclic prefix of each OFDM symbol in the first subframe, thereby avoiding interference between symbols and improving performance of a D2D ProSe.

Further, in this embodiment of the present invention, the first user equipment inserts a corresponding reference signal into the first subframe according to a reference signal insert mode corresponding to the first subframe, and sends the first subframe into which the reference signal is inserted to the second user equipment. It is proved through practical application that, reference symbol overheads are reduced as much as possible, and demodulation and decoding may be performed efficiently to restore an original D2D signal.

Figure 50:
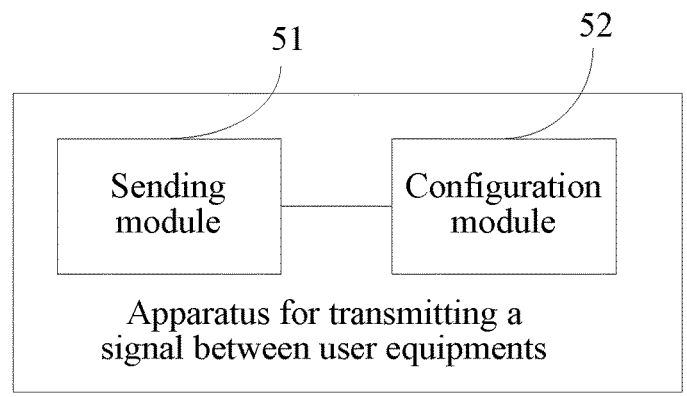
FIG. 50 is a schematic structural diagram of an apparatus for transmitting a signal between user equipments according to another embodiment of the present invention.

FIG. 50 is a schematic structural diagram of an apparatus for transmitting a signal between user equipments according to another embodiment of the present invention. As shown in FIG. 50, the apparatus, located on a side of a user equipment, includes:

a sending module 51, configured to send a first subframe to another user equipment, where a quantity of orthogonal frequency division multiplexing OFDM symbols included in the first subframe is less than a quantity of OFDM symbols included in a second subframe, and the second subframe is a subframe received by a network device; and the second subframe includes 14 OFDM symbols, the first subframe includes 13, 12, or 7 OFDM symbols, and the OFDM symbol includes valid data and a cyclic prefix.

A time length of the first subframe is 1 millisecond or 30,720 timeslots; and if the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

If the first subframe includes 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots, and time lengths of cyclic prefixes of the second to thirteenth OFDM symbols are all 315 timeslots;

if the first subframe includes 12 OFDM symbols, a time length of each OFDM symbol of the 12 OFDM symbols is 512 timeslots plus 2,048 timeslots, where a time length of a cyclic prefix of each OFDM symbol is 512 timeslots; or if the first subframe includes 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

For example, the apparatus further includes:

a configuration module 52, configured to insert a reference signal into the first subframe according to a reference signal insert mode corresponding to the first subframe.

If the first subframe includes 13 OFDM symbols, the reference signal insert mode corresponding to the subframe includes at least one of a first reference signal insert mode to a forty-first reference signal insert mode; or if the first subframe includes 12 OFDM symbols, the reference signal insert mode corresponding to the first subframe includes at least one of a forty-second reference signal insert mode to a forty-third reference signal insert mode; or if the first subframe includes 7 OFDM symbols, the reference signal insert mode corresponding to the first subframe includes at least one of a forty-fourth reference signal insert mode to a forty-fifth reference signal insert mode.

For example, the sending module 51 is specifically configured to send the first subframe into which the reference signal is inserted by the configuration module to the another user equipment, so that the another user equipment parses the first subframe according to the reference signal inserted into the first subframe.

In this embodiment of the present invention, a quantity of OFDM symbols included in a first subframe sent by a first user equipment to a second user equipment is reduced, so that the quantity of OFDM symbols included in the first subframe is less than a quantity (14) of OFDM symbols included in a second subframe sent by the first user equipment to a network device. In this way, a time length of a cyclic prefix of each OFDM symbol in the first subframe can be increased, and therefore, a time difference between a time at which the first subframe sent by the first user equipment reaches the second user equipment and uplink timing of the second user equipment is less than the time length of the cyclic prefix of each OFDM symbol in the first subframe, thereby avoiding interference between symbols and improving performance of a D2D ProSe.

Further, in this embodiment of the present invention, the first user equipment inserts a corresponding reference signal into the first subframe according to a reference signal insert mode corresponding to the first subframe, and sends the first subframe into which the reference signal is inserted to the second user equipment. It is proved through practical application that, reference symbol overheads are reduced as much as possible, and demodulation and decoding may be performed efficiently to restore an original D2D signal.

Figure 51:
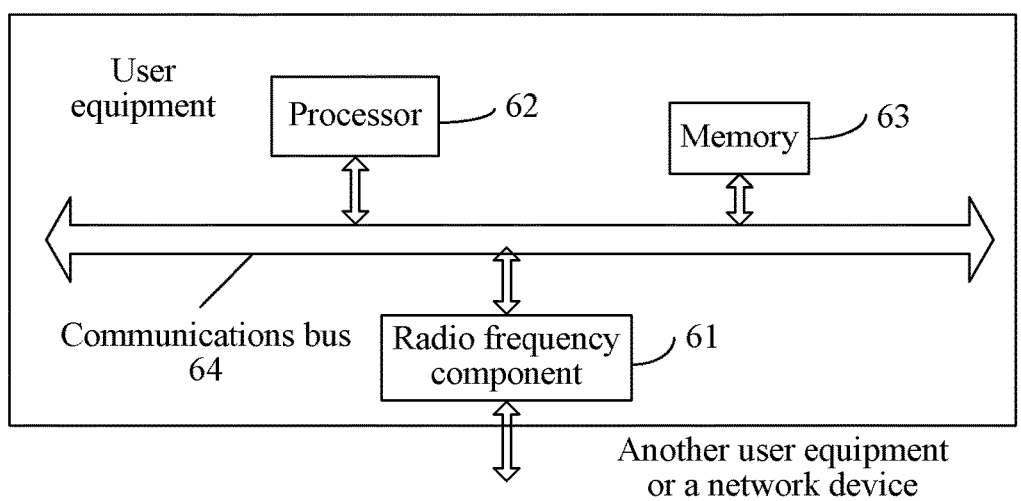
FIG. 51 is a schematic structural diagram of a user equipment according to another embodiment of the present invention.

FIG. 51 is a schematic structural diagram of a user equipment according to another embodiment of the present invention. As shown in FIG. 51, the user equipment includes a radio frequency component 61 and a processor 62, where the processor 62 is configured to: when the user equipment directly communicates with another user equipment, transmit D2D information by using a first subframe and send the first subframe to the radio frequency component 61, where the D2D information is information transmitted when the user equipment directly communicates with the another user equipment; and the radio frequency component 61 is configured to send the first subframe to the another user equipment, where specifically, the radio frequency component 61 sends the first subframe to the another user equipment by using an antenna, where a quantity of orthogonal frequency division multiplexing OFDM symbols included in the first subframe is less than a quantity of OFDM symbols included in a second subframe, and the second subframe is a subframe received by a network device; and the second subframe includes 14 OFDM symbols, the first subframe includes 13, 12, or 7 OFDM symbols, and the OFDM symbol includes valid data and a cyclic prefix.

A time length of the first subframe is 1 millisecond or 30,720 timeslots; and if the first subframe includes 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe includes 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe includes 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

If the first subframe includes 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, where a time length of a cyclic prefix of the first OFDM symbol is 316 timeslots, and time lengths of cyclic prefixes of the second to thirteenth OFDM symbols are all 315 timeslots;

if the first subframe includes 12 OFDM symbols, a time length of each OFDM symbol of the 12 OFDM symbols is 512 timeslots plus 2,048 timeslots, where a time length of a cyclic prefix of each OFDM symbol is 512 timeslots; or if the first subframe includes 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, where time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

For example, the processor 62 is further configured to insert a reference signal into the first subframe according to a reference signal insert mode corresponding to the first subframe, where if the first subframe includes 13 OFDM symbols, the reference signal insert mode corresponding to the subframe includes at least one of a first reference signal insert mode to a forty-first reference signal insert mode; or if the first subframe includes 12 OFDM symbols, the reference signal insert mode corresponding to the first subframe includes at least one of a forty-second reference signal insert mode to a forty-third reference signal insert mode; or if the first subframe includes 7 OFDM symbols, the reference signal insert mode corresponding to the first subframe includes at least one of a forty-fourth reference signal insert mode to a forty-fifth reference signal insert mode.

For example, the radio frequency component 61 is specifically configured to send the first subframe into which the reference signal is inserted by the processor to the another user equipment by using the antenna, so that the another user equipment parses, according to the reference signal inserted into the first subframe, the D2D information transmitted in the first subframe.

It should be noted that the radio frequency component 61 is further configured to receive, by using the antenna, the first subframe that is sent by the another user equipment and into which the reference signal is inserted; and the processor 62 is further configured to parse, according to the reference signal inserted into the first subframe, D2D information transmitted in the first subframe.

It should be noted that the user equipment in this embodiment further includes a memory 63 and a communications bus 64. The memory 63 stores instructions for implementing the foregoing method for transmitting a signal between user equipments, the processor 62 can invoke the instructions in the memory 63 to implement the foregoing method for transmitting a signal between user equipments, and the radio frequency component 61, the processor 62, and the memory 63 are connected by using the communications bus 64.

It should be noted that the processor 62 is further configured to: when the user equipment communicates with the network device, transmit information by using the second subframe, and send the second subframe to the radio frequency component 61; and the radio frequency component 61 is further configured to send the second subframe to the network device by using the antenna.

In this embodiment of the present invention, a quantity of OFDM symbols included in a first subframe sent by a first user equipment to a second user equipment is reduced, so that the quantity of OFDM symbols included in the first subframe is less than a quantity (14) of OFDM symbols included in a second subframe sent by the first user equipment to a network device. In this way, a time length of a cyclic prefix of each OFDM symbol in the first subframe can be increased, and therefore, a time difference between a time at which the first subframe sent by the first user equipment reaches the second user equipment and uplink timing of the second user equipment is less than the time length of the cyclic prefix of each OFDM symbol in the first subframe, thereby avoiding interference between symbols and improving performance of a D2D ProSe.

Further, in this embodiment of the present invention, the first user equipment inserts a corresponding reference signal into the first subframe according to a reference signal insert mode corresponding to the first subframe, and sends the first subframe into which the reference signal is inserted to the second user equipment. It is proved through practical application that, reference symbol overheads are reduced as much as possible, and demodulation and decoding may be performed efficiently to restore an original D2D signal.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory in English, ROM for short), a random access memory (Random Access Memory in English, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A method for transmitting a signal between user equipments, comprising:
   inserting, by a first user equipment, a reference signal into a first subframe according to a reference signal insert mode corresponding to the first subframe; and
   sending, by the first user equipment, the first subframe to a second user equipment, wherein
      a quantity of orthogonal frequency division multiplexing (OFDM) symbols comprised in the first subframe is less than a quantity of OFDM symbols comprised in a second subframe, and the second subframe is a subframe received by a network device;
      the second subframe comprises 14 OFDM symbols, the first subframe comprises 13, 12, or 7 OFDM symbols, and the OFDM symbol comprises valid data and a cyclic prefix, and wherein
      if the first subframe comprises 13 OFDM symbols, the reference signal insert mode corresponding to the first subframe comprises at least one of a first reference signal insert mode to a forty-first reference signal insert mode; or
      if the first subframe comprises 12 OFDM symbols, the reference signal insert mode corresponding to the first subframe comprises at least one of a forty-second reference signal insert mode to a forty-third reference signal insert mode; or
      if the first subframe comprises 7 OFDM symbols, the reference signal insert mode corresponding to the first subframe comprises at least one of a forty-fourth reference signal insert mode to a forty-fifth reference signal insert mode.

2. The method according to claim 1, wherein a time length of the first subframe is 1 millisecond or 30,720 timeslots; and
   if the first subframe comprises 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or
   if the first subframe comprises 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or
   if the first subframe comprises 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

3. The method according to claim 1, wherein
   if the first subframe comprises 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, wherein a time length of a cyclic prefix of the first OFDM symbol is 316 timeslots, and time lengths of cyclic prefixes of the second to thirteenth OFDM symbols are all 315 timeslots; or
   if the first subframe comprises 12 OFDM symbols, a time length of each OFDM symbol of the 12 OFDM symbols is 512 timeslots plus 2,048 timeslots, wherein a time length of a cyclic prefix of each OFDM symbol is 512 timeslots; or
   if the first subframe comprises 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, wherein time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

4. The method according to claim 1, wherein the sending, by a first user equipment, a first subframe to a second user equipment comprises:
   sending, by the first user equipment, the first subframe into which the reference signal is inserted to the second user equipment, so that the second user equipment parses the first subframe according to the reference signal inserted into the first subframe.

5. An apparatus for transmitting a signal between user equipments, located on a side of a user equipment, comprising:

a memory storing program(s); and a processor in communication with the memory to execute the program(s) to implement:

a configuration module, configured to insert a reference signal into the first subframe according to a reference signal insert mode corresponding to the first subframe;

a sending module, configured to send the first subframe to another user equipment, wherein a quantity of orthogonal frequency division multiplexing (OFDM) symbols comprised in the first subframe is less than a quantity of OFDM symbols comprised in a second subframe, and the second subframe is a subframe received by a network device; and the second subframe comprises 14 OFDM symbols, the first subframe comprises 13, 12, or 7 OFDM symbols, and the OFDM symbol comprises valid data and a cyclic prefix, wherein if the first subframe comprises 13 OFDM symbols, the reference signal insert mode corresponding to the subframe comprises at least one of a first reference signal insert mode to a forty-first reference signal insert mode; or if the first subframe comprises 12 OFDM symbols, the reference signal insert mode corresponding to the first subframe comprises at least one of a forty-second reference signal insert mode to a forty-third reference signal insert mode; or if the first subframe comprises 7 OFDM symbols, the reference signal insert mode corresponding to the first subframe comprises at least one of a forty-fourth reference signal insert mode to a forty-fifth reference signal insert mode.

6. The apparatus according to claim 5, wherein a time length of the first subframe is 1 millisecond or 30,720 timeslots; and if the first subframe comprises 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe comprises 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe comprises 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

7. The apparatus according to claim 5, wherein if the first subframe comprises 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, wherein a time length of a cyclic prefix of the first OFDM symbol is 316 timeslots, and time lengths of cyclic prefixes of the second to thirteenth OFDM symbols are all 315 timeslots; or if the first subframe comprises 12 OFDM symbols, a time length of each OFDM symbol of the 12 OFDM symbols is 512 timeslots plus 2,048 timeslots, wherein a time length of a cyclic prefix of each OFDM symbol is 512 timeslots; or if the first subframe comprises 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, wherein time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

8. The apparatus according to claim 5, wherein the sending module is configured to send the first subframe into which the reference signal is inserted by the configuration module to the another user equipment, so that the another user equipment parses the first subframe according to the reference signal inserted into the first subframe.

9. A user equipment, comprising a radio frequency component and a processor, wherein the processor is configured to:
insert a reference signal into a first subframe according to a reference signal insert mode corresponding to the first subframe, and when the user equipment directly communicates with another user equipment, transmit D2D information by using the first subframe and send the first subframe to the radio frequency component, wherein the D2D information is information transmitted when the user equipment directly communicates with the another user equipment; and the radio frequency component is configured to send the first subframe to the another user equipment by using an antenna, wherein a quantity of orthogonal frequency division multiplexing (OFDM) symbols comprised in the first subframe is less than a quantity of OFDM symbols comprised in a second subframe, and the second subframe is a subframe received by a network device; and the second subframe comprises 14 OFDM symbols, the first subframe comprises 13, 12, or 7 OFDM symbols, and the OFDM symbol comprises valid data and a cyclic prefix, wherein if the first subframe comprises 13 OFDM symbols, the reference signal insert mode corresponding to the subframe comprises at least one of a first reference signal insert mode to a forty-first reference signal insert mode; or if the first subframe comprises 12 OFDM symbols, the reference signal insert mode corresponding to the first subframe comprises at least one of a forty-second reference signal insert mode to a forty-third reference signal insert mode; or if the first subframe comprises 7 OFDM symbols, the reference signal insert mode corresponding to the first subframe comprises at least one of a forty-fourth reference signal insert mode to a forty-fifth reference signal insert mode.

10. The user equipment according to claim 9, wherein a time length of the first subframe is 1 millisecond or 30,720 timeslots; and if the first subframe comprises 13 OFDM symbols, subcarriers of the 13 OFDM symbols are 15 KHz, a time length of valid data of each OFDM symbol is 2,048 timeslots, and time lengths of cyclic prefixes of the 13 OFDM symbols are less than or equal to 2*2,048 timeslots and are greater than or equal to 1*2,048 timeslots; or if the first subframe comprises 12 OFDM symbols, subcarriers of the 12 OFDM symbols are 15 KHz, a time length of valid data of each OFDM symbol is 2,048 timeslots, and time lengths of cyclic prefixes of the 12 OFDM symbols are less than or equal to 3*2,048 timeslots and are greater than or equal to 2*2,048 timeslots; or if the first subframe comprises 7 OFDM symbols, subcarriers of the 7 OFDM symbols are 7.5 KHz, a time length of valid data of each OFDM symbol is 4,096 timeslots, and time lengths of cyclic prefixes of the 7 OFDM symbols are less than or equal to 2,048 timeslots.

11. The user equipment according to claim 9, wherein
if the first subframe comprises 13 OFDM symbols, a time length of the first OFDM symbol of the 13 OFDM symbols is 316 timeslots plus 2,048 timeslots, and time lengths of the second to thirteenth OFDM symbols are all 315 timeslots plus 2,048 timeslots, wherein a time length of a cyclic prefix of the first OFDM symbol is 316 timeslots, and time lengths of cyclic prefixes of the second to thirteenth OFDM symbols are all 315 timeslots;

if the first subframe comprises 12 OFDM symbols, a time length of each OFDM symbol of the 12 OFDM symbols is 512 timeslots plus 2,048 timeslots, wherein a time length of a cyclic prefix of each OFDM symbol is 512 timeslots; or if the first subframe comprises 7 OFDM symbols, time lengths of the first OFDM symbol and the fourth OFDM symbol of the 7 OFDM symbols are both 304 timeslots plus 2,048 timeslots, and time lengths of the second, third, fifth, sixth, and seventh OFDM symbols are all 288 timeslots plus 2,048 timeslots, wherein time lengths of cyclic prefixes of the first OFDM symbol and the fourth OFDM symbol are both 304 timeslots, and time lengths of cyclic prefixes of the second, third, fifth, sixth, and seventh OFDM symbols are all 288 timeslots.

12. The user equipment according to claim 9, wherein the radio frequency component is configured to send the first subframe into which the reference signal is inserted by the processor to the another user equipment by using the antenna, so that the another user equipment parses, according to the reference signal inserted into the first subframe, the D2D information transmitted in the first subframe.

13. The user equipment according to claim 9, wherein the radio frequency component is further configured to receive, by using the antenna, the first subframe that is sent by the another user equipment and into which the reference signal is inserted; and
the processor is further configured to parse, according to the reference signal inserted into the first subframe, D2D information transmitted in the first subframe.

14. The user equipment according to claim 9, wherein
the processor is further configured to: when the user equipment communicates with the network device, transmit information by using the second subframe, and send the second subframe to the radio frequency component; and
the radio frequency component is further configured to send the second subframe to the network device by using the antenna.

* * * * *